US011429408B2

(12) United States Patent
Xiang

(10) Patent No.: US 11,429,408 B2
(45) Date of Patent: *Aug. 30, 2022

(54) SYSTEM AND METHOD FOR NETWORK FUNCTION VIRTUALIZATION RESOURCE MANAGEMENT

(71) Applicant: Futurewei Technologies, Inc., Plano, TX (US)

(72) Inventor: Zhixian Xiang, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/164,452

(22) Filed: Feb. 1, 2021

(65) Prior Publication Data

US 2021/0182088 A1  Jun. 17, 2021

Related U.S. Application Data

(63) Continuation of application No. 16/291,949, filed on Mar. 4, 2019, now Pat. No. 10,908,936, which is a (Continued)

(51) Int. Cl.
*G06F 15/173* (2006.01)
*G06F 9/455* (2018.01)
*H04L 41/50* (2022.01)

(52) U.S. Cl.
CPC .......... *G06F 9/455* (2013.01); *G06F 9/45558* (2013.01); *H04L 41/5058* (2013.01);
(Continued)

(58) Field of Classification Search
CPC .......... H04F 45/22; H04F 45/70; H04F 47/10; G06F 2009/4557; G06F 9/45533
(Continued)

(56) References Cited

U.S. PATENT DOCUMENTS

2008/0201414 A1  8/2008 Amir Husain et al.
2013/0179574 A1  7/2013 Calder et al.
(Continued)

FOREIGN PATENT DOCUMENTS

CN  102857363 A  1/2013
CN  104219127 A  12/2014
(Continued)

OTHER PUBLICATIONS

ETSI, "Network Functions Virtualization (NFV); Management and Orchestration" Group Specification, ETSI GS NFV-MAN 001 v.1.1.1, Dec. 2014, pp. 1-184.
(Continued)

*Primary Examiner* — Wing F Chan
*Assistant Examiner* — Andrew Woo
(74) *Attorney, Agent, or Firm* — Slater Matsil, LLP

(57) ABSTRACT

Systems and methods for network function virtualization (NFV) resource management are disclosed that include receiving, by a network functions virtualization orchestrator (NFVO), a reuse requirement for a first network service (NS) and determining, by the NFVO, that at least one constituent virtual network function (VNF) instance in the first NS is retainable for reuse in a second NS according to the reuse requirement when the first NS is to be terminated. In some embodiments, these systems and methods also include retaining, by the NFVO, the at least one constituent VNF instance in the first NS for reuse in the second NS.

17 Claims, 8 Drawing Sheets

Related U.S. Application Data continuation of application No. 15/247,652, filed on Aug. 25, 2016, now Pat. No. 10,223,140.

(60) Provisional application No. 62/209,642, filed on Aug. 25, 2015, provisional application No. 62/239,655, filed on Oct. 9, 2015.

(52) U.S. Cl.
CPC ............... *G06F 2009/4557* (2013.01); *G06F 2009/45575* (2013.01)

(58) Field of Classification Search
USPC ........................................ 709/223, 224, 226
See application file for complete search history.

(56) References Cited

U.S. PATENT DOCUMENTS

| | | |
|---|---|---|
| 2013/0179895 A1 | 7/2013 | Calder et al. |
| 2014/0317261 A1 | 10/2014 | Shatzkamer et al. |
| 2015/0082308 A1 | 3/2015 | Kiess et al. |
| 2015/0089331 A1 | 3/2015 | Skerry et al. |
| 2015/0120928 A1 | 4/2015 | Gummaraju et al. |
| 2016/0043944 A1 | 2/2016 | Felstaine et al. |
| 2016/0078342 A1 | 3/2016 | Tang |
| 2016/0337172 A1 | 11/2016 | Yu |
| 2017/0331862 A1 | 11/2017 | Wang et al. |

FOREIGN PATENT DOCUMENTS

| | | |
|---|---|---|
| CN | 104253866 A | 12/2014 |
| CN | 104468688 A | 3/2015 |
| CN | 104601592 A | 5/2015 |
| WO | 2015113278 A1 | 8/2015 |

OTHER PUBLICATIONS

Shen, W., et al., "vConductor: An NFV Management Solution for Realizing End-to-End Virtual Network Services", The 16th Asia-Pacific Network Operations and Management Symposium, Sep. 17-19, 2014, pp. 1-6.

SYSTEM AND METHOD FOR NETWORK FUNCTION VIRTUALIZATION RESOURCE MANAGEMENT

This application is a continuation of U.S. patent application Ser. No. 16/291,949, filed on Mar. 4, 2019 and entitled "System and Method for Network Function Virtualization Resource Management," which is a continuation of U.S. patent application Ser. No. 15/247,652 (Now U.S. Pat. No. 10,223,140), filed on Aug. 25, 2016 and entitled "System and Method for Network Function Virtualization Resource Management," which claims priority to U.S. Provisional Patent Application No. 62/209,642, filed Aug. 25, 2015 and entitled "System and Method for Virtualized Network Function Instance Utilization," and also claims priority to U.S. Provisional Patent Application No. 62/239,655, filed Oct. 9, 2015 and entitled "VNFM Interaction with VIM for NFV Quota Resource Management," which are incorporated herein by reference as if reproduced in their entireties.

TECHNICAL FIELD

The present disclosure relates to network function virtualization (NFV), and, in particular embodiments, to a system and method for NFV resource management.

BACKGROUND

NFV is an industry effort to transform the way that network operators architect networks by evolving standard IT virtualization technology to consolidate many network equipment types onto industry standard high volume servers, switches and storage, with the goal of cost reduction and efficient network operation and performance. In non-virtualized networks, network functions (NFs) are implemented as a combination of vendor specific software and hardware. By contrast, in NFV environment, NFs are separated from the hardware they run on using virtual hardware abstraction to virtualize entire classes of NFs into building blocks that may be connected, or chained, together to create communication services.

SUMMARY

In one embodiment, a method is disclosed for network function virtualization (NFV) resource management that includes receiving, by a network functions virtualization orchestrator (NFVO), a reuse requirement for a first network service (NS) and determining, by the NFVO, that at least one constituent virtual network function (VNF) instance in the first NS is retainable for reuse in a second NS according to the reuse requirement when the first NS is to be terminated. In some embodiments, this method also include retaining, by the NFVO, the at least one constituent VNF instance in the first NS for reuse in the second NS.

In another embodiment, a method is disclosed for network function virtualization (NFV) resource management that includes receiving, by a network functions virtualization orchestrator (NFVO), a reuse requirement for a network service (NS), and determining, by the NFVO, whether at least one retained virtual network function (VNF) instance is available for the NS according to the reuse requirement. In some embodiments, this method also include reusing, by the NFVO, the at least one retained VNF instance for the NS.

In another embodiment, a network functions virtualization orchestrator (NFVO) is disclosed that includes a memory storage comprising instructions and one or more processors in communication with the memory. The one or more processors execute the instructions to receive a reuse requirement for a first network service (NS), determine whether at least one constituent virtual network function (VNF) instance in the first NS is capable of being retained for reuse in a second NS according to the reuse requirement when the first NS is to be terminated, and retain the at least one constituent VNF instance in the first NS for reuse in the second NS.

In another embodiment, a network functions virtualization orchestrator (NFVO) is disclosed that comprises a memory storage comprising instructions and one or more processors in communication with the memory. The one or more processors execute the instructions to receive a reuse requirement for a network service (NS), determine whether at least one retained virtual network function (VNF) instance is capable of being reused for the NS according to the reuse requirement, and reuse the at least one retained VNF instance for the NS.

In another embodiment, a method is disclosed for network function virtualization (NFV) resource management that includes receiving, by a virtual network function manager (VNFM), from a virtualized infrastructure manager (VIM) through an interface between the VNFM and the VIM quota information that indicates a maximum number of resources that are permitted to be allocated to the VNFM or to one or more VNF instances managed by the VNFM and performing, by the VNFM a resource management operation based on the quota information.

In yet another embodiment, a virtual network function manager (VNFM) is disclosed that includes a memory storage comprising instructions and one or more processors in communication with the memory. The one or more processors execute the instructions to receive from a virtualized infrastructure manager (VIM) through an interface between the VNFM and the VIM quota information that indicates a maximum number of resources that are permitted to be allocated to the VNFM or to one or more VNF instances managed by the VNFM, and perform a resource management operation based on the quota information.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

It should be understood at the outset that, although an illustrative implementation of one or more embodiments are provided below, the disclosed systems, apparatuses, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. While certain aspects of conventional technologies have been discussed to facilitate the present disclosure, applicants in no way disclaim these technical aspects, and it is contemplated that the present disclosure may encompass one or more of the conventional technical aspects discussed herein.

Figure 1:
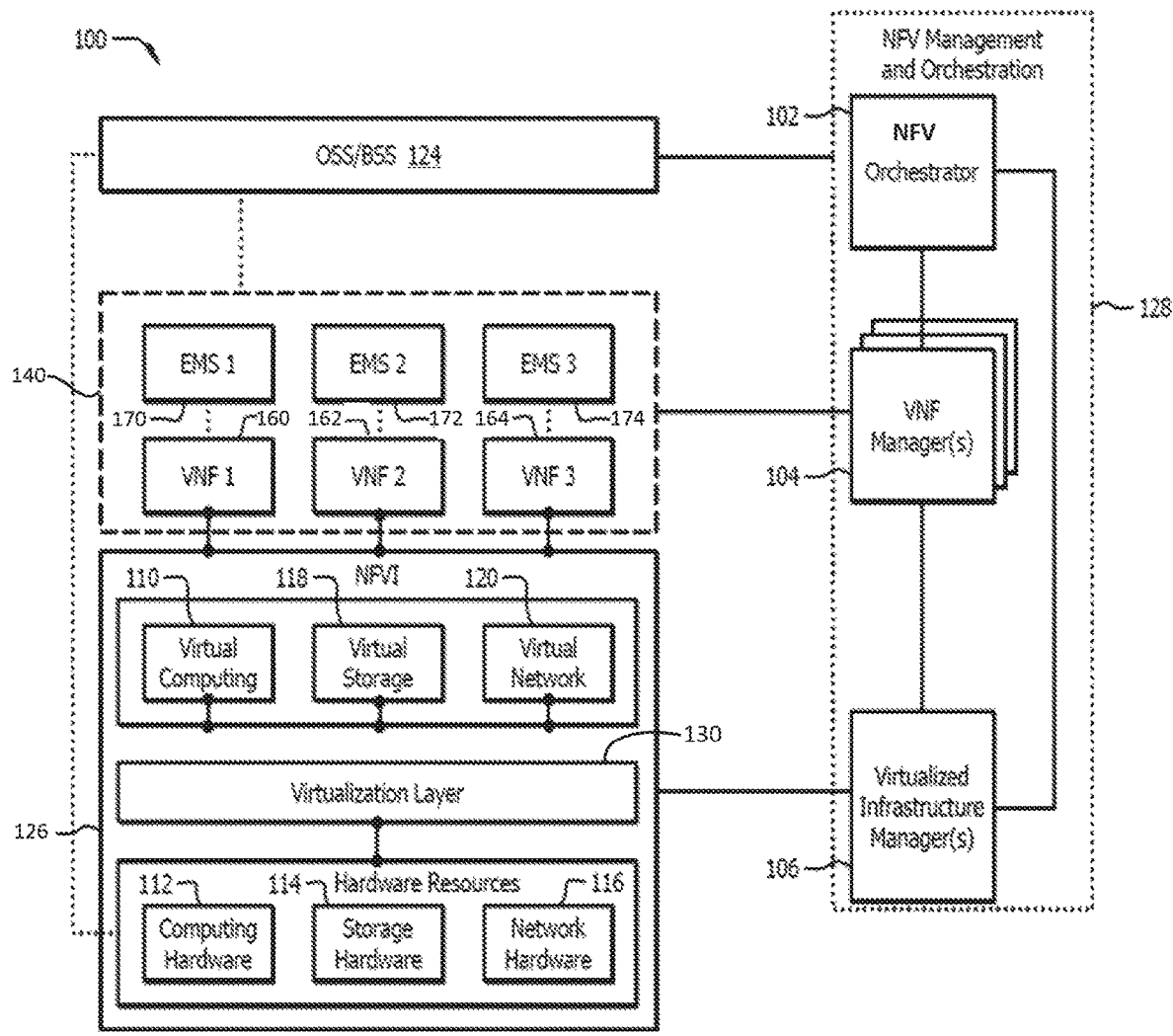
FIG. 1 illustrates a schematic diagram of an embodiment of an NFV system.

FIG. 1 is a schematic diagram of an embodiment of an NFV system 100 for use in various embodiments of the disclosed systems and methods. Some of this system is described in Network Functions Virtualization (NFV): Management and Orchestration (NFV-MANO), ETSI NFV-MAN 001 v1.1.1 (2014 December), which is hereby incorporated into this application in its entirety by reference. The NFV system 100 may comprise an NFV Management and Orchestration (NFV-MANO) entity 128, an NFV Infrastructure (NFVI) entity 126, a virtual function entity 140, and one or more Operations Support Systems (OSSs) and Business Support Systems (BSSs) (OSS/BSS) 124. The virtual function entity 140 may comprise a plurality of virtual network function (VNF) elements 160, 162, and 164, a plurality of element management system (EMS) elements 170, 172, and 174 that can be configured to perform the typical management functionality for the plurality of VNF elements 160, 162, and 164. In the while three (3) VNF and EMS elements are shown in FIG. 1, it is expressly contemplated that any number of these elements may be found in a system, and the selection of three is purely for the purpose of convenience. Moreover, it is understood that alternate configurations are contemplated by this disclosure, e.g., where a plurality of VNF elements 160, 162, and 164 are controlled by a single EMS.

The VNF elements are used to perform a virtualisation of a network function in a non-virtualized network. For example, the network functions in the non-virtualised network may be 3GPP Evolved Packet Core (EPC) network elements, e.g. Mobility Management Entity (MME), Serving Gateway (SGW), Packet Data Network Gateway (PGW); elements in a home network, e.g. Residential Gateway (RGW); and conventional network functions, e.g. Dynamic Host Configuration Protocol (DHCP) servers, firewalls, etc. For example, VNF 160 can be composed of one or more internal components, called virtualised network function components (VNFCs). Each VNFC provides a defined sub-set of that VNF's functionality, with the main characteristic that a single instance of this component maps 1:1 against a single virtualisation container. For example, one VNF can be deployed over multiple Virtual Machines (VMs), where each VM hosts a VNFC of the VNF. However, in some cases, the whole VNF can be deployed in a single VM as well. A VM may be virtualized computation environment that behaves like a physical computer or server, which has all its ingredients (processor, memory/storage, interfaces/ports) of a physical computer/server and is generated by a hypervisor, which partitions the underlying physical resources and allocates them to VMs. A hypervisor may be piece of software which partitions the underlying physical resources and creates virtual machines, and isolates the virtual machines from each other.

The NFV-MANO entity 128 may be responsible for the operation, management, and coordination of VNF elements 160, 162, and 164 and the respective NFVI entity 126. The NFV-MANO entity 128 may comprise an NFV Orchestrator (NFVO) entity 102, one or more VNF manager (VNFM) entities 104, and one or more Virtualized Infrastructure Manager (VIM) entities 106. The NFVO entity 102 can manage the network service (NS) lifecycle and coordinates the management of NS lifecycle, VNF lifecycle (supported by the VNFM entity 104) and NFVI resources (supported by the VIM entity 106) to ensure an optimized allocation of the necessary resources and connectivity. The VNFM entity 104 may communicate with VNF elements 160, 162, and 164 and be responsible for VNF lifecycle management (e.g. instantiation, update, query, scaling, and termination). For example, in one embodiment a VNFM entity 104 may be deployed for each VNF elements 160, 162, and 164. In other embodiments, a VNFM entity 104 may serve multiple VNF elements 160, 162, and 164. The VIM entity 106 can be responsible for controlling and managing the NFVI compute, storage and network resources. In other words, the VIM entity 106 may be configured to control and manage the interaction of a VNF with the compute, storage and network resources in NFVI entity 126. For example, the VIM entity 106 may perform resource management functions, such as management of infrastructure resource and allocation (e.g. increase resources to VMs, improve energy efficiency, and resource reclamation). The VIM entity 106 and the VNFM entity 104 may communicate with each other for resource allocation requests and to exchange virtualized hardware resource configuration and state information.

The NFVI entity 126 represents various hardware and software components which build up the environment in which VNFs are deployed, managed and executed. For example, the hardware components in the NFVI entity 126 may include computing hardware 112, storage hardware 114, and network hardware 116 that provide processing, storage and connectivity to VNF entities 160, 162, and 164 through a virtualization layer 130. The computing hardware 112 may be any device configured to, designed to, or otherwise enabled to provide processing and computing resources. The storage hardware 114 may be any kind of device which is used to store information for later retrieval. Examples of storage devices include flash memory, magnetic rotation disks, optical disks, or any other mechanism capable of storing information for later retrieval. Storage hardware 114 may be differentiated between shared network attached storage (NAS) and local storage that is connected directly to the NFVI using an internal bus or other attachment mechanism. In one embodiment, the resources from the computing hardware 112 and storage hardware 114 may be pooled together. The network hardware 116 may be switches that is configured to perform switching functions, e.g. routers, and wired or wireless links. The network hardware 116 may span across a plurality of network domains.

The virtualization layer 130 within the NFVI entity 126 may abstract the hardware resources, i.e., computing hardware 112, storage hardware 114, and network hardware 116 and decouple one or more of the VNF elements 160, 162, and 164 from the underlying hardware. For example, the virtualization layer 130 may be responsible for abstracting and logically partitioning hardware resources, enabling the software that implements the VNF to use the underlying virtualized infrastructure, and providing virtualized resources to the VNF entity. The virtualized resources controlled by the Virtualization Layer 130 may include a virtual computing 110, a virtual storage 118, and a virtual network 120.

Virtual resources consume physical resources. The reuse of virtual resources is may be advantageous to optimize the use and availability of physical resources. For the purposes of this disclosure, a reuse requirement is intended to refer to any criteria that may be used to determine if a VNF instance is to be retained or reused.

A reuse requirement is a criterion that is configured to be used by the NFVO to determine whether to retain, reuse, release or otherwise take actions to an existing VNF instance. For example, the reuse requirement specifies a requirement in accordance with which a constituent VNF instance of a specific NS is retainable for reuse. In another example, the reuse requirement specifies a requirement in accordance with which a retained VNF instance is capable of being reused for a NS. In some embodiments, the reuse requirement may be set by the OSS with at least one of security, redundancy or resource consideration. It is expressly contemplated that, in some embodiments, the reuse requirement may be implemented as a reuse policy, reuse constraint, reuse rule, reuse criterion or any other desirable forms. The reuse requirement allows the NFVO to determine whether to retain constituent VNF instances of the NS1 for reuse in other NS when the NS1 is to be terminated. Alternatively, the reuse requirement may allow the NFVO to determine whether to reuse the retained VNF instance for NS2.

Figure 2:
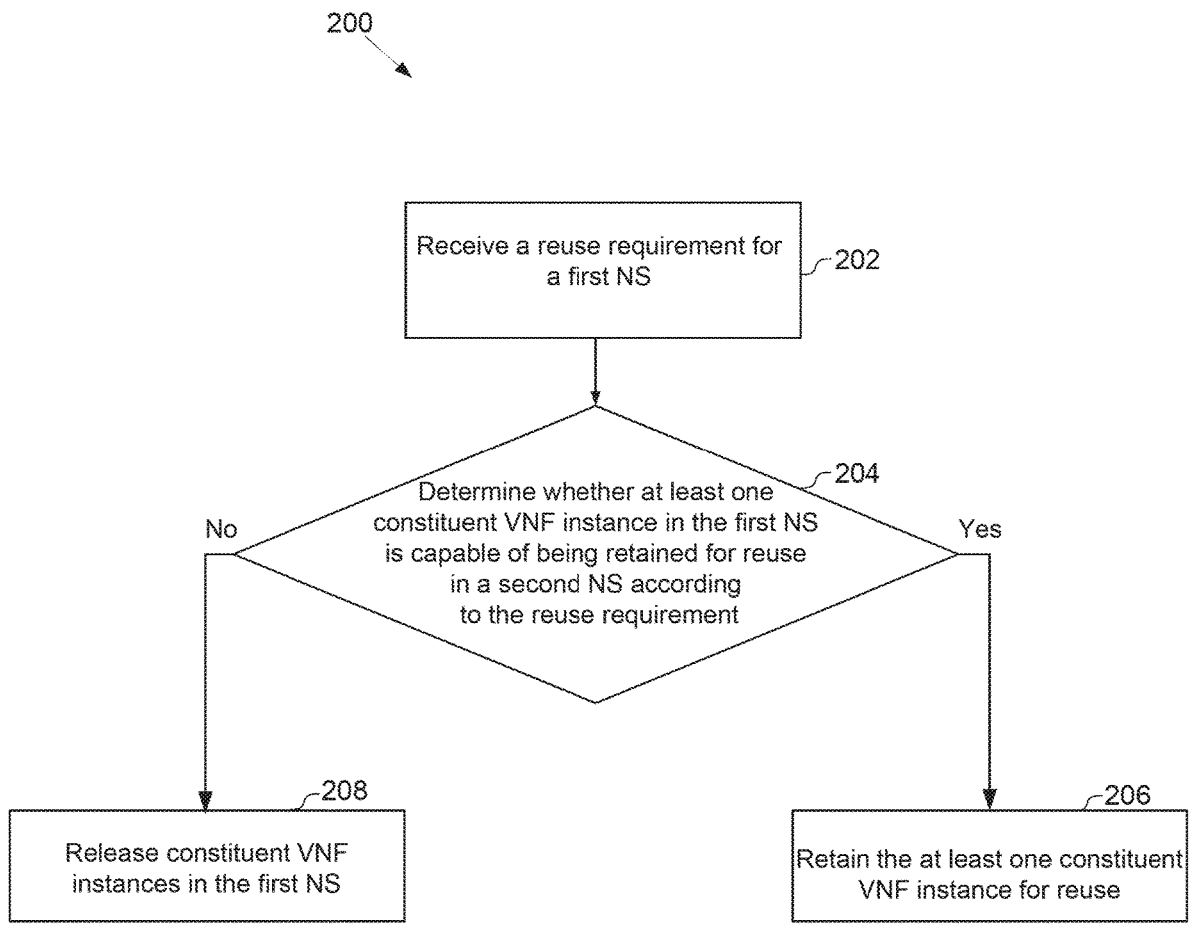
FIG. 2 illustrates a flow diagram of an embodiment of a method for NFV resource management.

FIG. 2 illustrates a flow diagram of an embodiment of a method 200 for NFV resource management. It is expressly understood that the embodiment method 200 may be carried out in the context of the NFV system as illustrated in FIG. 1.

At step 202, a NFVO receives a reuse requirement for a first NS. For example, the reuse requirement may be received from an OSS or other management entity which create the reuse requirement through an interaction mechanism, such as an application programming interface (API), an interaction message etc.

At step 204, the NFVO determines whether at least one constituent VNF instance in the first NS is capable of being retained for reuse in a second NS according to the reuse requirement. For example, the determination may be trigger when the first NS is to be terminated.

At step 206, if it is determined that at least one constituent VNF instance in the first NS is capable of being retained, the NFVO retains the at least one constituent VNF instance in the first NS for future reuse in the second NS.

At step 208, if it is determined that no constituent VNF instance in the first NS is capable of being retained, the NFVO then release constituent VNF instances in the first NS.

By retaining VNF instances for future reuse, rather than releasing these VNF instances, some cost and time to create these VNF instances for other NS may be saved. In addition, the OSS is responsible for service related management, while the NFVO is responsible for resource related management as well as VNF lifecycle management. As the determination on whether to retain VNF instances is made according to the received reuse requirement by the NFVO, instead of the OSS, the overall response time and the high traffic exchange between the OSS and the NFVO on VNF reuse management operations can also be reduced. The efficiency of VNF management operations is improved, and a more flexible deployment on VNF management operations is provided.

Figure 3:
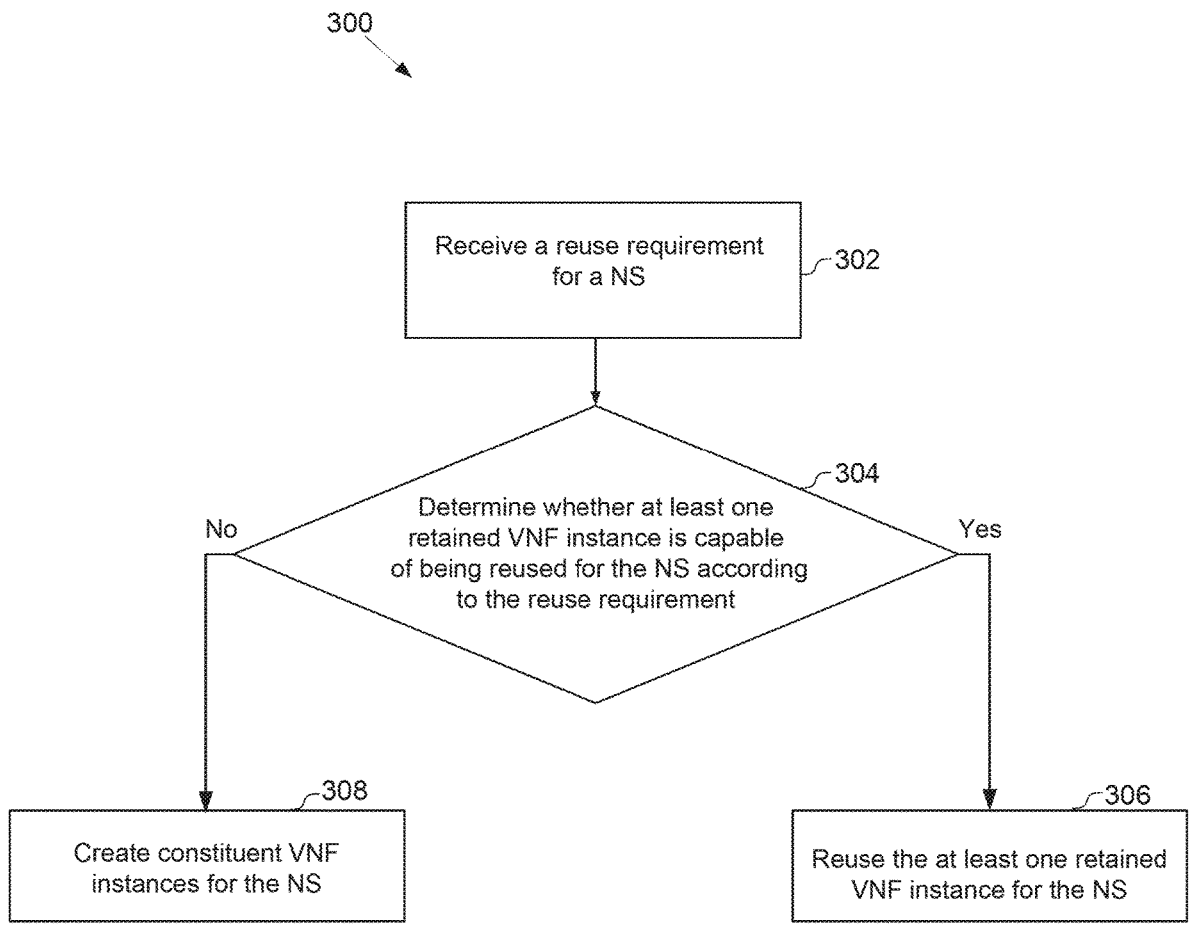
FIG. 3 illustrates a flow diagram of another embodiment of a method for NFV resource management.

FIG. 3 illustrates a flow diagram of another embodiment of a method 300 for NFV resource management. It is expressly understood that the embodiment method 300 may be carried out in the context of the NFV system as illustrated in FIG. 1.

At step 302, a NFVO receives a reuse requirement for a NS. For example, the reuse requirement may be received from an OSS or other management entity which create the reuse requirement through an interaction mechanism, such as an application programming interface (API), an interaction message etc.

At step 304, the NFVO determines whether at least one retained VNF instance is capable of being reused for the NS according to the reuse requirement. For example, the determination may be triggered when the NS is to be instantiated or scaled out.

At step 306, if it is determined that at least one retained VNF instance is capable of being reused, the NFVO reuses the at least one retained VNF instance for the NS.

At step 308, if it is determined that no retained VNF instance is capable of being reused, the NFVO then creates constituent VNF instances needed for the NS. For example, the NFVO may instantiate constituent VNF instances needed for the NS.

It is expressly understood that selected features of the example embodiment of FIG. 3 may be combined with selected features of the example embodiment of FIG. 2.

By reusing retained VNF instances for a NS, rather than creating new VNF instances, some cost and time may be saved. In addition, the OSS is responsible for service related management, while the NFVO is responsible for resource related management as well as VNF lifecycle management. As the determination on whether to reuse VNF instances is made according to the received reuse requirement by the NFVO, instead of the OSS, the overall response time and the high traffic exchange between the OSS and the NFVO on VNF reuse management operations can also be reduced. The efficiency of VNF management operations is improved, and a more flexible deployment on VNF management operations is provided.

Figure 4:
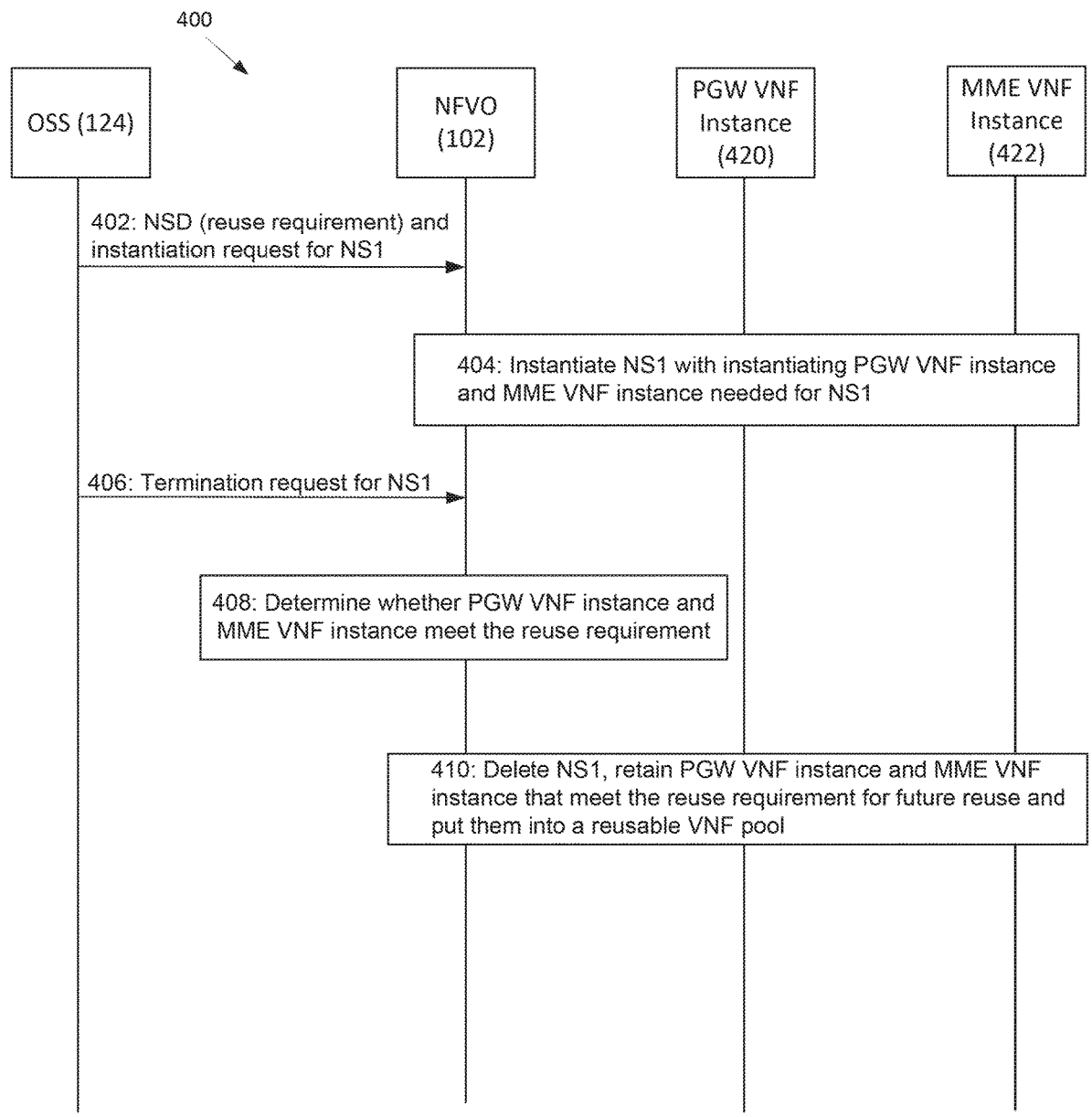
FIG. 4 illustrates a flow diagram of another embodiment of a method for NFV resource management.

FIG. 4 illustrates a flow diagram of another embodiment of a method 400 for NFV resource management. It is expressly understood that the embodiment method 400 may be carried out in the context of the NFV system as illustrated in FIG. 1.

FIG. 4 includes the use of a network service descriptor (NSD). A NSD is a deployment template which consists of information used by the NFVO for life cycle management of an NS. For example, the NSD may include service topology (such as constituent VNFs and the relationships between them, Virtual Links, VNF Forwarding Graphs) as well as Network Service characteristics and any other artefacts necessary for the NS on-boarding and lifecycle management. In some implementations, the NSD may be provided to the NFVO from the OSS by on-board NSD operation. For example, the NSD may be sent in an OnboardNsdRequest message to the NFVO through a NSD management interface.

At step 402, the OSS 124 creates a NSD for a NS1 including a reuse requirement and sends the NSD for the NS1 to the NFVO 102. In addition, the OSS 124 transmits an instantiation request for the NS1 to the NFVO 102 to request an instantiation of the NS1. For example, the OSS 102 may send the instantiation request for the NS1 to the NFVO 124 through a NS interface, such as a lifecycle management interface.

A lifecycle management interface is a connection between the OSS 124 and the NFVO 102 capable of communicating data requests, including, but not limited to a network data connection. The lifecycle management interface can used to provide runtime notifications related to the state of the VNF instance, as a result of changes made to VNF instance including (not limited to) changes in the number of VDUs, changing VNF configuration and/or topology due to auto-scaling/update/upgrade/termination, switching to/from standby, as well as other functions. These notifications facilitate updating consuming functional blocks regarding completion of operations that may have been triggered earlier (e.g. for keeping the NFV instances catalogue updated and/or the element management (EM) updated). It is understood that when the VNF Lifecycle Management interface is produced by the VNFM entity 104, then the VNFM can also produce the VNF Lifecycle Changes Notification interface. When the VNF Lifecycle Management interface is produced by the NFVO 102, then the NFVO 102 can also produce the VNF Lifecycle Changes Notification interface.

In this embodiment, the NSD includes a reuse requirement for constituent VNFs in the NS1. In some implementations, the reuse requirement may be indicated by an indicator or information element included in the NSD for the NS1. While not shown in FIG. 4, it is explicitly understood that, in some embodiments, the reuse requirement may be provided to the NFVO 102 through other suitable message from the OSS 124 to the NFVO 102, instead of the NSD for the NS1 or OnboardNsdRequest message.

At step 404, when the NFVO 102 receives the instantiation request for the NS1, it is assumed that no retained VNF instances currently exist. According to the NSD for the NS1, the NS1 needs two constituent VNF instances: a PGW VNF instance 420 and an MME VNF instance 422. In response to the instantiation request for the NS1, the NFVO 102 instantiates the NS1 with instantiating the PGW VNF instance 420 and the MME VNF 422 instance needed for the NS1. It is also understood that any number or types of VNF instances may be implemented to realize the NS1, and the implementation as illustrated in FIG. 4 is purely for the purpose of convenience.

At step 406, the OSS 124 decides to terminate the NS1, and sends a termination request for the NS1 to the NFVO 102 to ask a termination of the NS1. For example, the termination request may be sent to the NFVO 102 through a NS lifecycle management interface.

At step 408, in response to the termination request, the NFVO 102 determines whether the constituent VNF instances in the NS1 (i.e., the PGW VNF instance 420 and MME VNF instance 422) meet the reuse requirement and thus are capable of being retained. If it is determined that the constituent VNF instances in the NS1 meet the reuse requirement and thus are capable of being retained, then executes step 410.

In some embodiments, multiple types or forms of reuse requirements described below may be used alone or in combination with one another.

In one of these embodiments, the reuse requirement may be a capacity or load requirement for one or more constituent VNF instances capable of being retained. For example, the load requirement specifies that the load of the constituent VNF instance capable of being retained is required to be equal or less than a threshold value. In another example, the capacity requirement specifies that the remaining capacity of the constituent VNF instance capable of being retained is required to be equal or greater than a threshold value, e.g., 50%. It is expressly contemplated that any suitable threshold value may be set, and the selection of 50% is purely for the purpose of illustration. If the NFVO finds out that the remaining capacity of each of the PGW VNF instance and MME VNF instance in the NS1 is equal or greater than 50%, the NFVO then determines that the PGW VNF instance and MME VNF instance in the NS1 meet the reuse requirement and are capable of being retained.

In another of these embodiments, the reuse requirement may be a location constraint for one or more constituent VNF instances capable of being retained. For example, the location constraint may specify that a PGW VNF instance in geographic location 1 is capable of being retained and that an MME VNF instance in geographic location 2 is capable of being retained. If the NFVO finds out that the geographic locations of the PGW VNF instance and the MME VNF instance in the NS1 meet the location constraint, the NFVO then determines that the PGW VNF instance and MME VNF instance in the NS1 are capable of being retained. It is also understood that the location constraint may be set to specify that a constituent VNF instance in certain location cannot be retained.

In another of these embodiments, the reuse requirement may be a VNF relationship rule. For example, the VNF relationship rule may specify that constituent VNF instances with certain relationship between them can be retained together. If the NFVO finds out that the relationship between the PGW VNF instance and the MME VNF instance in the NS1 matches the VNF relationship rule, the NFVO then determines that the PGW VNF instance and MME VNF instance in the NS1 are capable of being retained together. In another example, the VNF relationship rule may specify that constituent VNF instances with certain relationship between them cannot be retained together. It is expressly understood that the VNF relationship rule may be set in light of vendor, security or function considerations.

In another of these embodiments, the reuse requirement may be a NS type constraint. For example, the NS type constraint may specify that a constituent VNF instance in a given type of NS can be retained. If the NFVO finds out that the NS1 meets the NS type constraint, the NFVO then determines that the PGW VNF instance and MME VNF instance in the NS1 are capable of being retained. It is also understood that the NS type constraint may be set that a constituent VNF instance in a given type of NS cannot be retained.

In another of these embodiments, the reuse requirement may be a VNF type constraint. For example, the VNF type constraint may specify that one or more given types of constituent VNF instances can be retained. If the NFVO finds out that the PGW VNF instance and the MME VNF instance in the NS1 match the VNF type constraint, the NFVO then determines that the PGW VNF instance and MME VNF instance in the NS1 are capable of being retained. It is also understood that the VNF type constraint may be set to specify that one or more given types of constituent VNF instances cannot be retained.

In yet another of these embodiments, the reuse requirement may relate to a reusable time period in which one or more constituent VNF instances are allowed to be used. When the reusable time period expires, the one or more constituent VNF instances need to be released. For example, the reusable time period may be set as 30 days for the PGW VNF instance and the MME VNF instance in the NS1. If the NFVO finds out that the PGW VNF instance and the MME VNF instance in the NS1 have been just used for 2 days, the NFVO then determines that the PGW VNF instance and MME VNF instance in the NS1 are capable of being retained.

At step 410, if the NFVO determines that the PGW VNF instance 420 and MME VNF instance 422 in the NS1 meet the reuse requirement and thus are capable of being retained, the NFVO then deletes the NS1 and retains the PGW VNF instance 420 and MME VNF instance 422 for future reuse in other NSs, instead of releasing the PGW VNF instance 420 and MME VNF instance 422. In some embodiments, the NFVO puts the retained VNF instances into a reusable VNF pool and removes all configurations for the PGW VNF instance 420 and MME VNF instance 422 in the NS1. For example, the reusable VNF pool may be implemented as a database to keep track of those retained VNF instances status. It is expressly contemplated that any other suitable mechanisms may be implemented to keep those retained VNF instances alive and to keep track of them, the selection of the pool mechanism is purely for the purpose of illustration. For example, the NFVO may instead maintain a list of retained VNF instances.

While not shown in FIG. 4, it is explicitly understood that, in some embodiments, if the NFVO determines that the PGW VNF instance and MME VNF instance in the NS1 do not meet the reuse requirement, the NFVO then releases the PGW VNF instance and MME VNF instance and delete the NS1.

Moreover, it is also understood that the NS termination operation as described above is just an example for the purpose of illustration. Other types of NS lifecycle management operations could also be applied in this embodiment method.

By retaining VNF instances of a terminated NS for future reuse, rather than releasing these VNF instances, some cost and time to create these VNF instances for other NS may be saved. In addition, the OSS is responsible for service related management, while the NFVO is responsible for resource related management as well as VNF lifecycle management. As the determination on whether to retain VNF instances is made according to the received reuse requirement/policy by the NFVO, instead of the OSS, the overall response time and the high traffic exchange between the OSS and the NFVO on VNF reuse management operations can also be reduced. The efficiency of VNF management operations is improved, and a more flexible deployment on VNF management operations is provided.

In one embodiment of the present disclosure, a NFVO including means for receiving a reuse requirement for a first NS and means for determining whether at least one constituent VNF instance in the first NS is capable of being retained for reuse in a second NS according to the reuse requirement when the first NS is to be terminated is disclosed. The embodiment of NFVO also includes means for retaining the at least one constituent VNF instance in the first NS for reuse in the second NS. It is expressly understood that this NFVO embodiment may be operated consistent with the method embodiments as illustrated in FIG. 2 and FIG. 4. With respect to detailed implementations of this NFVO embodiment, reference can be made to the above-mentioned method embodiments.

Figure 5:
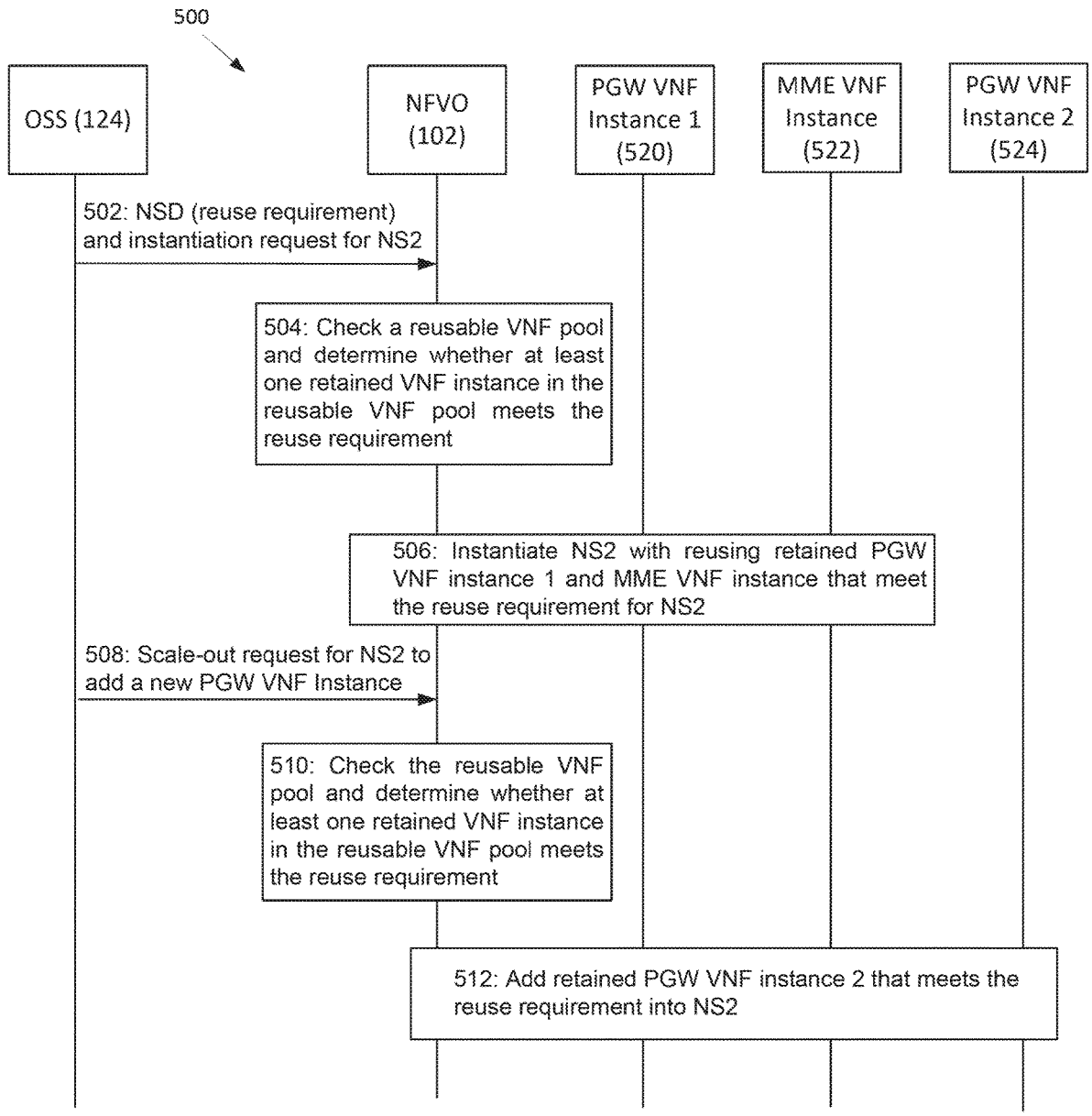
FIG. 5 illustrates a flow diagram of another embodiment of a method for NFV resource management.

FIG. 5 illustrates a flow diagram of another embodiment of a method 500 for NFV resource management. It is expressly understood that the embodiment method 500 may be carried out in the context of the NFV system as illustrated in FIG. 1.

At step 502, the OSS 124 creates a NSD for a NS2 including a reuse requirement and sends the NSD for the NS2 to the NFVO 102. In some implementations, the NSD may be provided to the NFVO from the OSS 124 by on-board NSD operation. For example, the NSD may be sent in an OnboardNsdRequest message to the NFVO 102 through a NSD management interface. In addition, the OSS transmits an instantiation request for the NS2 to the NFVO 102 to request an instantiation of the NS2. For example, the OSS 124 may send the instantiation request for the NS2 to the NFVO 102 through a NS lifecycle management interface.

In this embodiment, the NSD for the NS2 includes a reuse requirement for constituent VNFs in the NS2. In some implementations, the reuse requirement may be indicated by an indicator or information element included in the NSD for the NS2. While not shown in FIG. 5, it is explicitly understood that, in some embodiments, the reuse requirement may be provided to the NFVO through other suitable message from the OSS 124 to the NFVO 102, rather than the NSD for the NS2 or OnboardNsdRequest message.

The reuse requirement is configured to be used by the NFVO 102 to determine how to reuse retained VNF instances for the NS2. For example, the reuse requirement specifies a requirement in accordance with which a retained VNF instance is capable of being reused for the NS2. In some embodiments, the reuse requirement may be set by the OSS with at least one of security, redundancy or resource consideration. It is expressly contemplated that, in some embodiments, the reuse requirement may be implemented as a reuse policy, reuse constraint, reuse rule, reuse criterion or any other desirable forms. It is also understood that the reuse requirement as described in the embodiment of FIG. 5 may be used alone or in combination with the reuse requirement as described in the embodiment of FIG. 4.

At step 504, in response to the instantiation request for the NS2, the NFVO 102 checks a reusable VNF pool and determines whether at least one retained VNF instance in the reusable VNF pool meets the reuse requirement for the NS2. The reusable VNF pool, for example, includes three retained VNF instances: a PGW VNF instance 1 520, a PGW VNF instance 2 524 and a MME VNF instance 522. According to the NSD for the NS2, the NS2 needs two constituent VNF instances: a PGW VNF instance and an MME VNF instance 522. Thus the NFVO needs to determine whether the three retained VNF instances meet the reuse requirement. If it is determined that the retained PGW VNF instance 1 520 and MME VNF instance 522 meet the reuse requirement and thus are capable of being reused for the NS2, then executes step 506.

It is also understood that any number or types of VNF instances may be implemented with respect to the NS2 and the reusable VNF pool, and the implementation as illustrated in FIG. 5 is purely for the purpose of illustration.

In some embodiments, multiple types or forms of reuse requirements described below may be used alone or in combination with one another.

In one of these embodiments, the reuse requirement may be a capacity or load requirement for one or more retained VNF instances capable of being reused. For example, the load requirement specifies that the load of the retained VNF instance capable of being reused is required to be equal or less than a threshold value. In another example, the capacity requirement specifies that the remaining capacity of the retained VNF instance capable of being reused is required to be equal or greater than a threshold value, e.g., 70%. It is expressly contemplated that any suitable threshold value may be set, and the selection of 70% is purely for the purpose of illustration. If the NFVO finds out that the remaining capacity of each of the retained PGW VNF instance 1 520 and MME VNF instance 522 in the reusable VNF pool is equal or greater than 70%, the NFVO then determines that the retained PGW VNF instance 1 520 and MME VNF instance 522 meet the reuse requirement and are capable of being reused for the NS2.

In another of these embodiments, the reuse requirement may be a location constraint for one or more retained VNF instances capable of being reused for the NS2. For example, the location constraint may specify that a PGW VNF instance in geographic location 1 is capable of being reused and that an MME VNF instance 522 in geographic location 2 is capable of being reused. If the NFVO finds out that the geographic locations of the retained PGW VNF instance 1 520 and the MME VNF instance 522 in the reusable VNF pool meet the location constraint, the NFVO then determines that the PGW VNF instance 1 520 and MME VNF instance 522 are capable of being reused. It is also understood that the location constraint may be set to specify that a retained VNF instance in certain location cannot be reused.

In another of these embodiments, the reuse requirement may be a VNF relationship rule. For example, the VNF relationship rule may specify that retained VNF instances with certain relationship between them can be reused together for the NS2. If the NFVO 102 finds out that the relationship between the retained PGW VNF instance 1 520 and the MME VNF instance 522 in the reusable VNF pool matches the VNF relationship rule, the NFVO then determines that the retained PGW VNF instance 1520 and MME VNF instance 522 are capable of being reused together. In another example, the VNF relationship rule may specify that retained VNF instances with certain relationship between them cannot be reused together for the NS2. It is expressly understood that the VNF relationship rule may be set in light of vendor, security or function considerations.

In another of these embodiments, the reuse requirement may be a NS type constraint. For example, the NS type constraint may specify that a retained VNF instance can be reused for a given type of NS. If the NFVO 102 finds out that the NS2 meets the NS type constraint, the NFVO 102 then determines that the retained PGW VNF instance 1520 and MME VNF instance 522 in the reusable VNF pool are capable of being reused. It is also understood that the NS type constraint may be set that a retained VNF instance cannot be reused for a given type of NS.

In another of these embodiments, the reuse requirement may be a VNF type constraint. For example, the VNF type constraint may specify that one or more given types of retained VNF instances can be reused for the NS2. If the NFVO finds out that the retained PGW VNF instance 1 520 and the MME VNF instance 522 in the reusable VNF pool match the VNF type constraint, the NFVO then determines that the PGW VNF instance 1 520 and MME VNF instance 522 are capable of being reused. It is also understood that the VNF type constraint may be set that one or more given types of retained VNF instances cannot be reused for the NS2.

In another of these embodiments, the reuse requirement may be a NS number constraint. For example, the NS number constraint may indicate a maximum number of NSs that are permitted to reuse a retained VNF instance simultaneously. If the NFVO finds out that the NS number constraint is matched, the NFVO then determines that the PGW VNF instance 1 and MME VNF instance are capable of being reused.

In yet another of these embodiments, the reuse requirement may relate to a reusable time period in which one or more constituent VNF instances in NS2 are allowed to be used. When the reusable time period expires, the one or more constituent VNF instances need to be released. For example, the reusable time period for one or more constituent VNF instances in the NS2 may be set as 20 days. If the NFVO finds out that the remaining reusable time period for each of the retained PGW VNF instance 1 520 and the MME VNF instance 522 exceeds 20 days, the NFVO then determines that the PGW VNF instance 1520 and MME VNF instance 522 meet the reuse requirement and thus are capable of being reused for the NS2.

At step 506, the NFVO then instantiates the NS2 with reusing retained PGW VNF instance 1 520 and MME VNF instance 522 that meet the reuse requirement for NS2. In particular, the NFVO adds the PGW VNF instance 1 520 and MME VNF instance 522 into the NS2 and configures the PGW VNF instance 1520 and MME VNF instance 522 for the NS2.

While not shown in FIG. 5, it is explicitly understood that, in some embodiments, if the NFVO determines that no retained VNF instance in the reusable VNF pool meets the reuse requirement for the NS2, the NFVO instead instantiates a PGW VNF instance and a MME VNF instance 522 to instantiate the NS2.

At step 508, the OSS transmits a scale-out request for the NS2 to the NFVO, in order to add a new PGW VNF instance. For example, the OSS may send the scale-out request to the NFVO 102 through a lifecycle management interface.

At step 510, in response to the scale-out request for the NS2, the NFVO checks the reusable VNF pool and determines whether at least one retained VNF instance in the reusable VNF pool meets the reuse requirement for the NS2. It is assumed that the reusable VNF pool, for example, currently includes the PGW VNF instance 2 524. Thus the NFVO needs to determine whether the retained PGW VNF instance 2 524 meets the reuse requirement. If it is determined that the retained PGW VNF instance 2 524 meets the reuse requirement and thus is capable of being reused for the NS2, then executes step 512.

At step 512, the NFVO 102 then scales out the NS2 with reusing the retained PGW VNF instance 2 524 that meets the reuse requirement for NS2. In particular, the NFVO adds the PGW VNF instance 2 524 into the NS2 and configures the PGW VNF instance 2 524 for the NS2.

While not shown in FIG. 5, it is explicitly understood that, in some embodiments, if the NFVO determines that no retained VNF instance in the reusable VNF pool meets the reuse requirement for the NS2, the NFVO instead instantiates or creates a PGW VNF instance to scale out the NS2.

Moreover, it is also understood that the NS instantiation and scaling operations described above are just examples for the purpose of illustration. Other types of NS lifecycle management operations could also be applied in this embodiment method. The NS lifecycle management operations may include, but not limited to, instantiation, termination, scaling, updating and healing operation etc.

It is also understood that selected features of the example embodiment of FIG. 5 may be combined with selected features of the example embodiment of FIG. 4.

By reusing retained VNF instances for a NS, rather than creating new VNF instances, some cost and time may be saved. In addition, the OSS is responsible for service related management, while the NFVO is responsible for resource related management as well as VNF lifecycle management. As the determination on whether to reuse VNF instances is made according to the received reuse requirement/policy by the NFVO, instead of the OSS, the overall response time and the high traffic exchange between the OSS and the NFVO on VNF reuse management operations can also be reduced. The efficiency of VNF management operations is improved, and a more flexible deployment on VNF management operations is provided.

In one embodiment of the present disclosure, a NFVO including means for receiving a reuse requirement for a NS and means for determining whether at least one retained VNF instance is capable of being reused for the NS according to the reuse requirement is disclosed. The embodiment of NFVO also includes means for reusing the at least one retained VNF instance for the NS. It is expressly understood that this NFVO embodiment may be operated consistent with the method embodiments as illustrated in FIG. 3 and FIG. 5. With respect to detailed implementations of this NFVO embodiment, reference can be made to the above-mentioned method embodiments.

Figure 6:
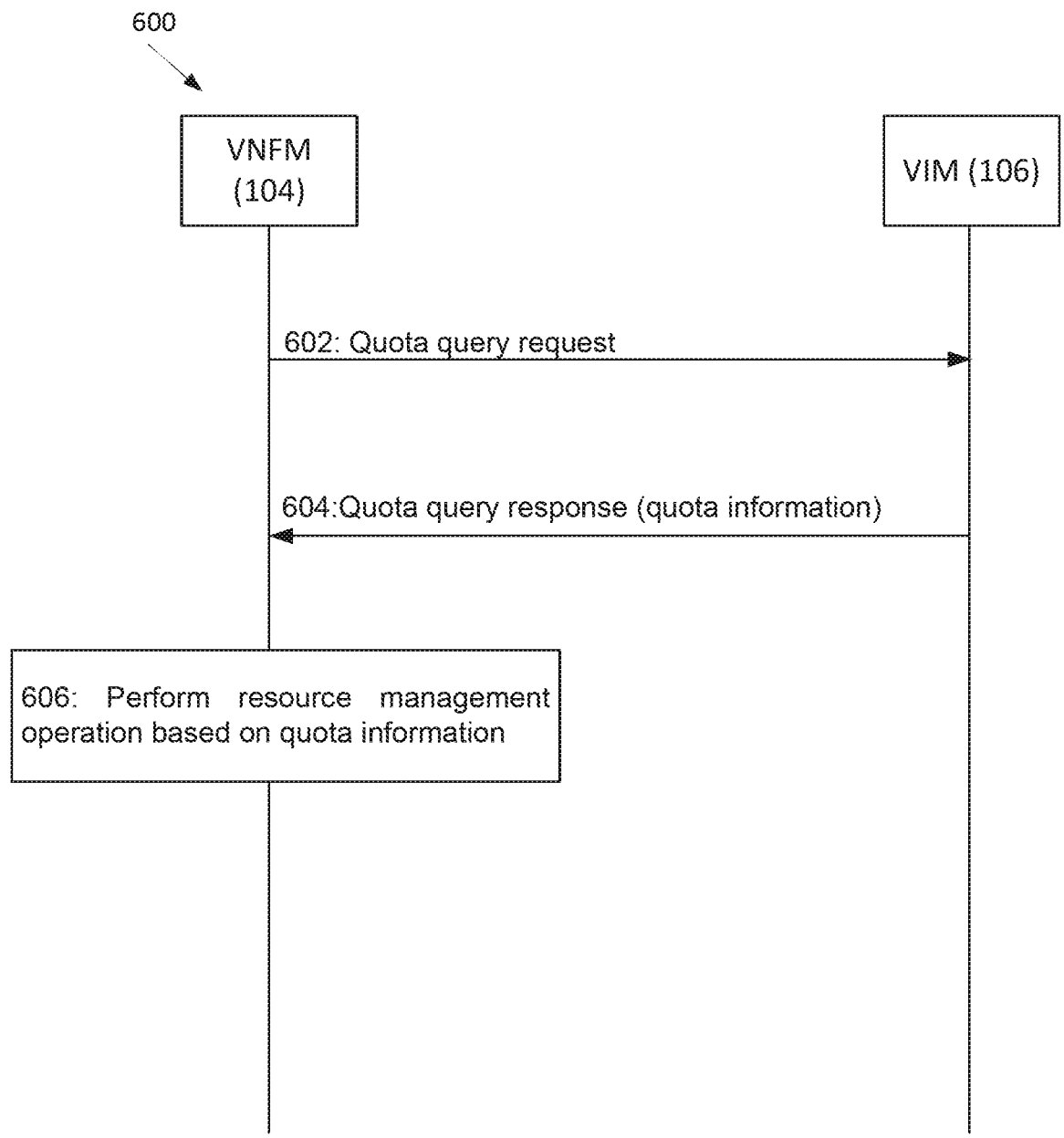
FIG. 6 illustrates a flow diagram of another embodiment of a method for NFV resource management.

FIG. 6 illustrates a flow diagram of another embodiment of a method for NFV resource management. It is expressly understood that the embodiment method 600 may be carried out in the context of the NFV system as illustrated in FIG. 1.

At step 602, the VNFM 104 sends to the VIM 106 a quota query request for querying quota information. The quota query request is sent through an interface between the VNFM 104 and VIM, i.e., VNFM-VIM interface.

At step 604, in response to the quota query request, the VIM 106 returns a quota query response including quota information to the VNFM 104. The quota query response is directly sent to the VNFM 104 through the VNFM-VIM interface without going through the NFVO. For example, the quota information may include quota resource information which specifies a maximum number of resources that are permitted to be allocated to the VNFM 104 or to the one or more VNF instances managed by the VNFM 104. In another example, the quota information may include quota metadata information, or quota status information. The resources allocated include, but not limited to compute resources, network resources, and storage resources.

At step 606, the VNFM 104 performs a resource management operation based on the quota information. For example, the resource management operation may include VNF lifecircle management operation. The VNFM 104 may request resources from the VIM or configure its VNFs according to the quota information received through the VNFM-VIM interface.

By receiving the quota information through the VNFM-VIM interface without going through the NFVO, the overall response time on quota-based resource management performed by the VNFM may be reduced. The signaling overhead between the NFVO and VNFM on quota related management is also reduced. The efficiency of quota-based resource management is thus improved.

Figure 7:
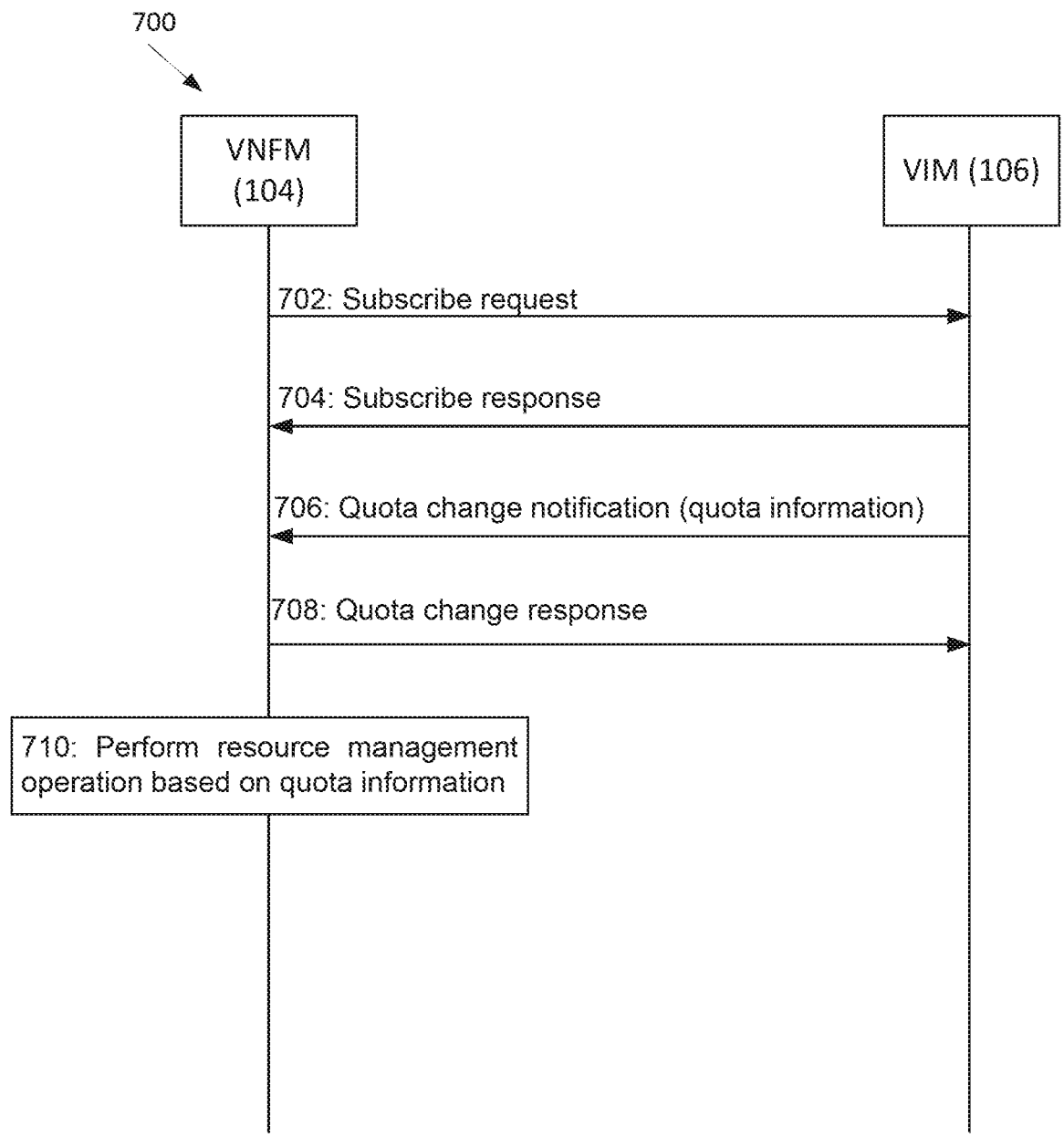
FIG. 7 illustrates a flow diagram of yet another embodiment of a method for NFV resource management.

FIG. 7 illustrates a flow diagram of another embodiment of a method for NFV resource management. It is expressly understood that the embodiment method 700 may be carried out in the context of the NFV system as illustrated in FIG. 1.

At step 702, a VNFM 104 sends to a VIM 106 a subscribe request for subscription to changes on quota. The subscribe request is sent through an interface between the VNFM 104 and VIM, i.e., VNFM-VIM 106 interface.

At step 704, in response to the subscribe request, the VIM 106 returns a subscribe response with a result of subscription through the VNFM-VIM 106 interface. It is assumed that the subscription to changes on quota is successful. It is expressly understood that steps 702-704 are optional.

At step 706, after successful subscription, the VNFM 104 is registered to receive notifications related to changes on quota from the VIM. When the quota information is updated, the VIM 106 sends to the VNFM 104 a quota change notification including quota information through the VNFM-VIM 106 interface without going through the NFVO. The quota information may include quota change information. For example, the quota change information may indicate changes on a maximum number of resources that are permitted to be allocated to the VNFM 104 or to the one or more VNF instances managed by the VNFM. The quota change information may further indicate a change type. It is expressly contemplated that the change on the maximum number may include a change from 0 to a certain number and vice versa. It is also understood that the resources allocated to the VNFM 104 include, but not limited to compute resources, network resources, and storage resources.

At step 708, after receiving the quota change notification, the VNFM 104 transmits a quota change response to the VIM. It is also understood this step is optional.

At step 710, the VNFM 104 performs a resource management operation based on the quota information. For example, the resource management operation may include VNF lifecircle management operation. The VNFM 104 may request resources from the VIM 106 or configure its VNFs according to the quota information received through the VNFM-VIM 106 interface.

By receiving the quota information through the VNFM-VIM 106 interface without going through the NFVO, the overall response time on quota-based resource management performed by the VNFM 104 may be reduced. The signaling overhead between the NFVO and VNFM 104 on quota related management is also reduced. The efficiency of quota-based resource management is thus improved.

In one embodiment of the present disclosure, a VNFM including means for receiving from a VIM through an interface between the VNFM and the VIM quota information that indicates a maximum number of resources that are permitted to be allocated to the VNFM or to one or more VNF instances managed by the VNFM is disclosed. This embodiment of VNFM also includes means for performing a resource management operation based on the quota information. It is expressly understood that this VNFM embodiment may be operated consistent with the method embodiments as illustrated in FIG. 6 and FIG. 7. With respect to detailed implementations of this VNFM embodiment, reference can be made to the above-mentioned method embodiments.

The following reference is related to subject matter of the present disclosure. The reference is incorporated herein by reference in its entirety: U.S. Provisional Patent Application Ser. No. 62/158,381, filed on May 7, 2015, entitled "System and Method for VNFM Assist NFV Quota Resource Management."

Figure 8:
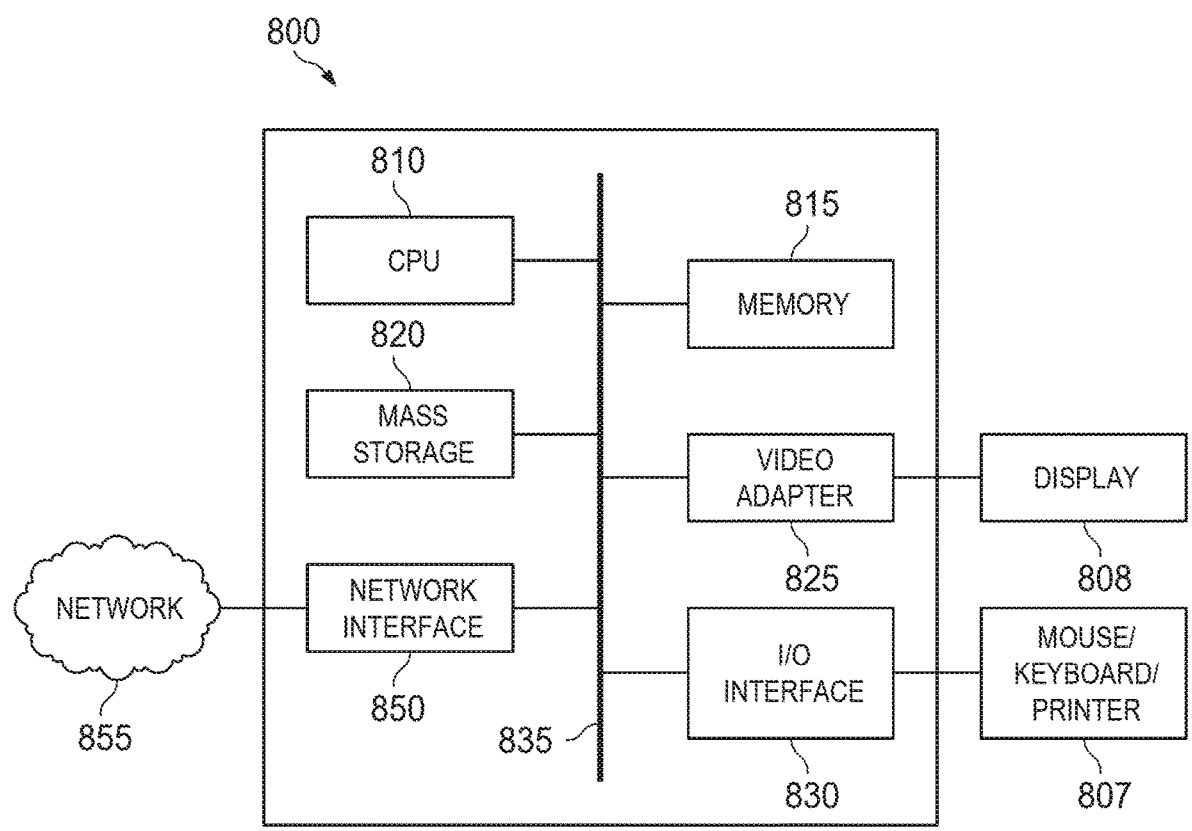
FIG. 8 illustrates a block diagram of an embodiment processing system for performing the methods described herein.

FIG. 8 illustrates a block diagram of a processing system 800 that may be used for implementing the methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 800 may comprise a processing unit equipped with one or more input/output devices, such as a speaker, microphone, mouse, touchscreen, keypad, keyboard, printer, 807, a display 808, and the like. The processing unit may include a central processing unit (CPU) 810, memory 815, a mass storage device 820, a video adapter 825, and an I/O interface 830 connected to a bus 835.

The bus 835 may be one or more of any type of several bus architectures including a memory bus or memory controller, a peripheral bus, video bus, or the like. The CPU 810 may comprise any type of electronic data processor. The memory 815 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 815 may include ROM for use at boot-up, and DRAM for program and data storage for use while executing programs.

The mass storage device 820 may comprise any type of non-transitory storage device configured to store data, programs, and other information and to make the data, programs, and other information accessible via the bus 835. The mass storage device 820 may comprise, for example, one or more of a solid state drive, hard disk drive, a magnetic disk drive, an optical disk drive, or the like.

The video adapter 825 and the I/O interface 830 provide interfaces to couple external input and output devices to the processing unit. As illustrated, examples of input and output devices include the display 807 coupled to the video adapter 825 and the mouse/keyboard/printer 805 coupled to the I/O interface 830. Other devices may be coupled to the processing unit, and additional or fewer interface devices may be utilized. For example, a serial interface such as Universal Serial Bus (USB) (not shown) may be used to provide an interface for a printer.

The processing system 800 also includes one or more network interfaces 850, which may comprise wired links, such as an Ethernet cable or the like, and/or wireless links to access nodes or different networks 855. The network interface 850 allows the processing system 800 to communicate with remote units via the network(s) 855. For example, the network interface 850 may provide wireless communication via one or more transmitters/transmit antennas and one or more receivers/receive antennas. In an embodiment, the processing system 800 is coupled to a local-area network or a wide-area network 855 for data processing and communications with remote devices, such as other processing units, the Internet, remote storage facilities, or the like.

Although a combination of features is shown in the illustrated examples, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for network function virtualization (NFV) resource management comprising:

receiving, by a network functions virtualization orchestrator (NFVO), a network service descriptor (NSD) that includes a first NSD for a first network service (NS), wherein the NSD requires that at least one virtual network function (VNF) instance of the first NS be retained after the first NS is terminated; and retaining, by the NFVO in accordance with the NSD, the at least one VNF instance after terminating the first NS.

2. The method of claim 1, wherein the at least one VNF instance is retained in a second NS that is different than the first NS.

3. The method of claim 1, wherein the NSD includes a VNF relationship rule.

4. The method of claim 3, wherein the at least one VNF instance includes at least one constituent VNF instance, and wherein the VNF relationship rule specifies that other constituent VNF instances of the first NS having a certain relationship with the at least one constituent VNF instance are required to be retained together with the at least one constituent VNF instance after the first NS is terminated.

5. The method of claim 3, wherein the at least one VNF instance includes at least one constituent VNF instance, and wherein the VNF relationship rule specifies that other constituent VNF instances having a certain relationship with the at least one constituent VNF instance are not permitted to be retained together with the at least one constituent VNF instance after the first NS is terminated.

6. The method of claim 1, wherein the at least one VNF instance includes a constituent VNF instance.

7. An apparatus comprising:
a processor; and
a non-transitory computer readable storage medium storing programming for execution by the processor, the programming including instructions to:
receive, by a network functions virtualization orchestrator (NFVO), a network service descriptor (NSD) that includes a first NSD for a first network service (NS), wherein the NSD requires that at least one virtual network function (VNF) instance of the first NS be retained after the first NS is terminated; and
retain, by the NFVO in accordance with the NSD, the at least one VNF instance after terminating the first NS.

8. The apparatus of claim 7, wherein the at least one VNF instance is retained in a second NS that is different than the first NS.

9. The apparatus of claim 7, wherein the NSD includes a VNF relationship rule.

10. The apparatus of claim 9, wherein the at least one VNF instance includes at least one constituent VNF instance, and wherein the VNF relationship rule specifies that other constituent VNF instances of the first NS having a certain relationship with the at least one constituent VNF instance are required to be retained together with the at least one constituent VNF instance after the first NS is terminated.

11. The apparatus of claim 9, wherein the at least one VNF instance includes at least one constituent VNF instance, and wherein the VNF relationship rule specifies that other constituent VNF instances having a certain relationship with the at least one constituent VNF instance are not permitted to be retained together with the at least one constituent VNF instance after the first NS is terminated.

12. The apparatus of claim 9, wherein the at least one VNF instance includes a constituent VNF instance.

13. A method for network function virtualization (NFV) resource management comprising:

receiving, by a virtual network function manager (VNFM), a query quota request indicating a quota specifying a number of virtual resources that are permitted to be allocated to the VNFM or to one or more virtual network function (VNF) instances managed by the VNFM; and sending, by the VNFM, a subscribe request to a virtualized infrastructure manager (VIM), the subscribe request requesting a subscription to notifications of changes to the quota.

14. The method of claim 13, further comprising receiving, by the VNFM in response to the subscribe request, a subscribe response indicating that the subscription associated with the subscribe request is successful.

15. An apparatus comprising:
a processor; and
a non-transitory computer readable storage medium storing programming for execution by the processor, the programming including instructions to:
receive, by a virtual network function manager (VNFM), a query quota request indicating a quota specifying a number of virtual resources that are permitted to be allocated to the VNFM or to one or more virtual network function (VNF) instances managed by the VNFM; and
send, by the VNFM, a subscribe request to a virtualized infrastructure manager (VIM), the subscribe request requesting a subscription to notifications of changes to the quota.

16. The apparatus of claim 15, further comprising receiving, by the VNFM in response to the subscribe request, a subscribe response indicating that the subscription associated with the subscribe request is successful.

17. A method for network function virtualization (NFV) resource management comprising:
receiving, by a network functions virtualization orchestrator (NFVO), a network service descriptor (NSD) that includes a virtual network function (VNF) relationship rule indicating that two or more VNF instances are to be retained together following termination of a network service; and retaining, by the NFVO in accordance with the NSD, the two or more VNF instances following the termination of the NS.

\* \* \* \* \*